US012427544B2

(12) United States Patent
Gross et al.

(10) Patent No.: US 12,427,544 B2
(45) Date of Patent: Sep. 30, 2025

(54) CMUT TRANSDUCER

(71) Applicant: VERMON SA, Tours (FR)

(72) Inventors: Dominique Gross, Tours (FR); Cyril Meynier, Tours (FR); Nicolas Senegond, Tours (FR)

(73) Assignee: VERMON SA, Tours (FR)

( * ) Notice: Subject to any disclaimer, the term of this patent is extended or adjusted under 35 U.S.C. 154(b) by 400 days.

(21) Appl. No.: 17/637,712

(22) PCT Filed: Aug. 25, 2020

(86) PCT No.: PCT/IB2020/000732
§ 371 (c)(1),
(2) Date: Feb. 23, 2022

(87) PCT Pub. No.: WO2021/038300
PCT Pub. Date: Mar. 4, 2021

(65) Prior Publication Data

US 2022/0274134 A1 Sep. 1, 2022

Related U.S. Application Data

(60) Provisional application No. 62/894,231, filed on Aug. 30, 2019.

(51) Int. Cl.
*B06B 1/02* (2006.01)

(52) U.S. Cl.
CPC .................................. *B06B 1/0292* (2013.01)

(58) Field of Classification Search
CPC ........... B06B 1/00; B06B 1/02; B06B 1/0215; B06B 1/023; B06B 1/0292; B06B 1/04; B06B 1/064; B06B 1/0648; B06B 1/0651; B06B 1/0696; B06B 3/00; B06B 3/02; B06B 2201/00; B06B 2201/20; B06B 2201/50; B06B 2201/51; G01N 29/2406; G01H 11/06; G10K 9/12; G10K 9/121
See application file for complete search history.

(56) References Cited

U.S. PATENT DOCUMENTS 9,132,450 B2 * 9/2015 Huang .................. B06B 1/0238
9,351,706 B2 5/2016 Rothberg et al.
2006/0004289 A1 * 1/2006 Tian ...................... B06B 1/0292
600/459

(Continued)

OTHER PUBLICATIONS

European Patent Office, International Search Report issued in corresponding Application No. PCT/IB2020/000732, mailed Dec. 21, 2020.

*Primary Examiner* — Christopher M Koehler
*Assistant Examiner* — Ahmed F Seck
(74) *Attorney, Agent, or Firm* — Stites & Harbison, PLLC; Jeffrey A. Haeberlin

(57) ABSTRACT

The present disclosure relates to a CMUT transducer (200) comprising: a substrate (101) coated with a dielectric layer (103); a cavity (105) formed in the dielectric layer (103); a conductive or semiconductor membrane (107) suspended above the cavity (105); and a dielectric coating (104) arranged on an upper surface of the substrate (101) at the bottom of the cavity or on a lower surface of the membrane at the top of the cavity and extending, in top view, on the most part of the surface of the cavity (105), wherein the dielectric coating (104) is structured opposite the cavity (105).

9 Claims, 3 Drawing Sheets

(56) References Cited

U.S. PATENT DOCUMENTS

| | | | | |
|---|---|---|---|---|
| 2007/0180916 | A1 | 8/2007 | Tian et al. | |
| 2008/0194053 | A1* | 8/2008 | Huang | B06B 1/0292 257/E21.532 |
| 2008/0200811 | A1* | 8/2008 | Wakabayashi | B06B 1/0292 600/459 |
| 2009/0058228 | A1* | 3/2009 | Wakabayashi | B06B 1/0292 29/25.35 |
| 2011/0068654 | A1* | 3/2011 | Cheng | B06B 1/0292 310/300 |
| 2014/0236018 | A1* | 8/2014 | Matsumoto | B06B 1/0292 367/181 |
| 2014/0239768 | A1* | 8/2014 | Johnson | H04R 19/005 310/300 |
| 2014/0239769 | A1 | 8/2014 | Johnson et al. | |
| 2015/0145374 | A1* | 5/2015 | Xu | G10K 9/122 29/25.35 |
| 2015/0294663 | A1* | 10/2015 | Klootwijk | C23C 16/45525 216/6 |
| 2016/0310992 | A1* | 10/2016 | Van Rens | A61B 8/4494 |
| 2017/0080460 | A1* | 3/2017 | Mauczok | B81C 1/00476 |
| 2018/0243792 | A1* | 8/2018 | Rothberg | B81C 1/00698 |
| 2020/0091058 | A1* | 3/2020 | Riegler | H01L 24/89 |

* cited by examiner

CMUT TRANSDUCER

TECHNICAL BACKGROUND

The present disclosure generally relates to the field of ultrasound transducers and, more particularly, to that of capacitive micromachined ultrasonic transducers, also called CMUT transducers.

PRIOR ART

Conventionally, a CMUT transducer comprises a flexible membrane suspended above a cavity, a first electrode, called lower electrode, located on the side of the cavity opposite to the membrane, and a second electrode, called upper electrode, located on the side of the cavity opposite to the first electrode and rigidly attached to the flexible membrane. When an appropriate excitation voltage is applied between the lower and upper electrodes of the transducer, the flexible membrane starts vibrating under the effect of the electrostatic force applied between the lower and upper electrodes, and emits an ultrasound acoustic wave. Conversely, when the transducer receives an acoustic wave in a given frequency range, the flexible membrane starts vibrating, which results in the appearing of an alternative voltage between the lower and upper electrodes of the transducer under the effect of the capacitance variation between the electrodes (when a DC bias is applied between the lower and upper electrodes).

A CMUT transducer is conventionally coupled to an electronic control circuit configured to, during a transmission phase, apply an excitation voltage between the transducer electrodes, to cause the transmission of an ultrasound wave by the transducer and, during a reception phase, read the voltage generated between the lower and upper electrodes of the transducer under the effect of the received ultrasound wave.

It would be desirable to have a CMUT transducer structure overcoming all or part of the disadvantages of known CMUT transducer structures.

SUMMARY

To achieve this, an embodiment provides a CMUT transducer comprising:

a substrate coated with a dielectric layer;

a cavity formed in the dielectric layer;

a conductive or semiconductor membrane suspended above the cavity; and a dielectric coating arranged on an upper surface of the substrate at the bottom of the cavity or on a lower surface of the membrane at the top of the cavity and extending, in top view, on the most part of the surface of the cavity, wherein the dielectric coating is structured opposite the cavity.

According to an embodiment, the dielectric coating comprises a first portion having a first thickness opposite a peripheral portion of the cavity, and a second portion having a second thickness greater than the first thickness opposite a central portion of the cavity.

According to an embodiment, the dielectric coating further comprises, between the first and second portions, at least one third portion having an intermediate thickness between the first and second thicknesses.

According to an embodiment, the dielectric coating comprises a first portion having a first thickness opposite a peripheral portion of the cavity, and a second portion having a second thickness smaller than the first thickness opposite a central portion of the cavity.

T According to an embodiment, the dielectric coating further comprises, between the first and second portions, at least one third portion having an intermediate thickness between the first and second thicknesses.

According to an embodiment, the dielectric coating comprises a first portion having a first thickness opposite a peripheral portion of the cavity, a second portion having a second thickness greater than the first thickness opposite a central portion of the cavity, and a third portion having a third thickness greater than the second thickness between the first and second portions.

According to an embodiment, the dielectric coating is interrupted opposite a peripheral region of the cavity.

According to an embodiment, the substrate is made of silicon.

According to an embodiment, the dielectric layer is made of silicon oxide.

According to an embodiment, the membrane is made of silicon.

According to an embodiment, the dielectric coating is made of silicon oxide.

An embodiment provides a method of manufacturing the CMUT transducer, comprising the successive steps of:

a) forming the dielectric layer on the upper surface of the substrate;

b) forming the cavity on the upper surface side of the dielectric layer; and c) transferring the membrane onto the upper surface of the dielectric layer, above the cavity.

According to an embodiment, step b) comprises a plurality of successive steps of etching at different depths and with different etch masks, to form the different thickness levels of the dielectric coating.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various possible applications of the described transducers have not been detailed, the described embodiments being compatible with usual applications of ultrasound transducers, particularly in ultrasound imaging devices. Further, the circuits for controlling the described transducers have not been detailed, the described embodiments being compatible with all or most known CMUT transducer control circuits.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms “front”, “back”, “top”, “bottom”, “left”, “right”, etc., or to relative positional qualifiers, such as the terms “above”, “below”, “higher”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

Figure 1:
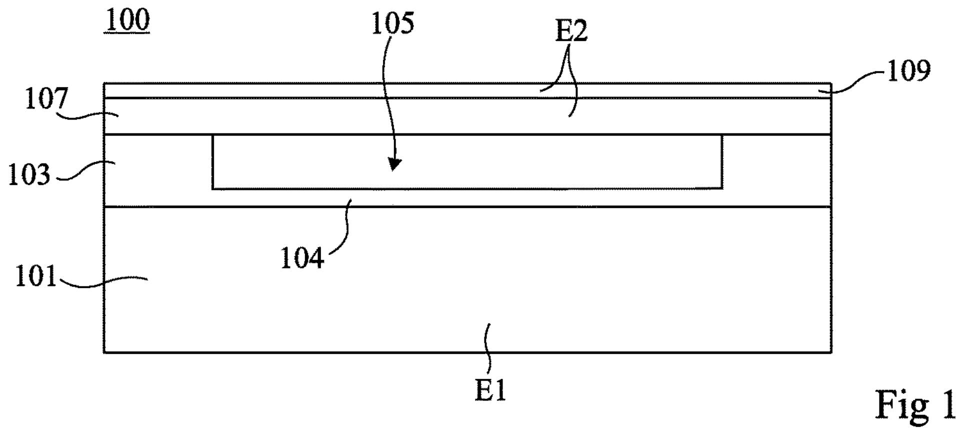
FIG. 1 is a cross-section view schematically showing an example of a CMUT transducer.

FIG. 1 is a cross-section view schematically showing an example of a CMUT transducer 100.

Transducer 100 comprises a doped semiconductor layer 101, for example, made of silicon, defining a lower electrode E1 of the transducer.

Semiconductor layer 101 is coated, on its upper surface side, with a rigid support layer 103 made of a dielectric material, for example, silicon oxide. In the shown example, layer 103 is in contact, by its lower surface, with the upper surface of semiconductor layer 101.

Transducer 100 further comprises a cavity 105 formed in layer 103. Cavity 105 extends vertically from the upper surface of layer 103, towards its lower surface. In the shown example, cavity 105 is non-through, that is, it does not emerge on the lower surface side of layer 103. In other words, a dielectric coating 104, formed by a lower portion of the thickness of layer 103, extends on the upper surface of electrode 101 at the bottom of cavity 101.

Transducer 100 further comprises a flexible membrane 107 suspended above cavity 105. In this example, membrane 107 is made of a semiconductor material, for example, of silicon. Membrane 107 extends above cavity 105 and is attached, at the periphery of cavity 105, by its lower surface, to the upper surface of dielectric layer 103. As an example, the lower surface of membrane 107 is directly in contact with the upper surface of dielectric layer 103 at the periphery of cavity 105.

Transducer 100 further comprises, above membrane 107, a conductive layer 109, for example, a metal layer. Conductive layer 109 for example extends over substantially the entire upper surface of membrane 107. In the shown example, conductive layer 109 is in contact, by its lower surface, with the upper surface of membrane 107. Conductive layer 109 and semiconductor membrane 107 define an upper electrode E2 of the transducer.

Transducer 100 may be coupled to an electronic control circuit CTRL, not detailed, connected to its lower and upper electrodes E1 and E2, configured to, during a transmission phase, apply an excitation voltage between electrodes E1 and E2 and, during a reception phase, read a voltage between electrodes E1 and E2. As an example, the control circuit may be configured to, during transmission and/or reception phases, apply a DC bias voltage between electrodes E1 and E2. During transmission phases, the control circuit further applies between electrodes E1 and E2 an AC excitation voltage superposed to the DC bias voltage, to cause a vibration of membrane 107 resulting in the transmission of an ultrasound acoustic wave. During reception phases, an AC voltage superposed to the DC bias voltage appears between electrodes E1 and E2 under the effect of the received acoustic wave. The AC voltage is read by the control circuit.

When the voltage applied between electrodes E1 and E2 of the transducer exceeds, in absolute value, a given threshold, called “collapse voltage”, flexible membrane 107 is capable of coming into contact, by its lower surface, with the bottom of cavity 105, in a central region (in top view) of cavity 105. In this position, called collapsed, of the membrane, the dielectric coating 104 located at the bottom of cavity 105 enables to avoid a short-circuit between electrodes E1 and E2 of the transducer (via semiconductor membrane 107).

The structure of FIG. 1 has certain limitations that it would be desirable to totally or partly overcome.

According to an aspect common to the embodiments described hereafter in relation with FIGS. 2A, 2B, 3, 4A, 4B, and 5, it is provided to structure the dielectric coating 104 extending on the upper surface of electrode E1 at the bottom of cavity 105, to overcome all or part of the limitations of the structure of FIG. 1.

A limitation of a CMUT transducer of the type described in relation with FIG. 1 is its relatively low sensitivity. The sensitivity of a CMUT transducer of the type described in relation with FIG. 1 is particularly linked to the ratio of the so-called active capacitance to the so-called parasitic capacitance, formed between electrodes E1 and E2 of the transducer. The capacitance formed between the portions of electrodes E1 and E2 located opposite a central portion of cavity 105, where the amplitude of the vertical displacements of the membrane is relatively large, is called active, since it actively takes part in the ultrasound transduction. The capacitance formed between the portions of electrodes E1 and E2 located opposite a peripheral portion of cavity 105, in the immediate vicinity of the cavity edges, where the amplitude of the vertical displacements of the membrane is zero or negligible, is called parasitic, since it does not or only slightly take part in the ultrasound transduction.

Figure 2A:
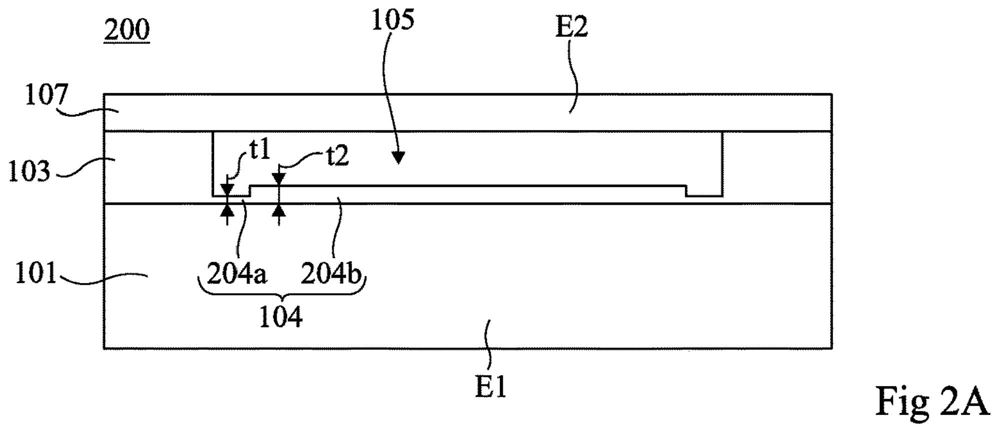
FIGS. 2A and 2B respectively are a simplified cross-section view and a simplified top view schematically showing an embodiment of a CMUT transducer.
Figure 2B:
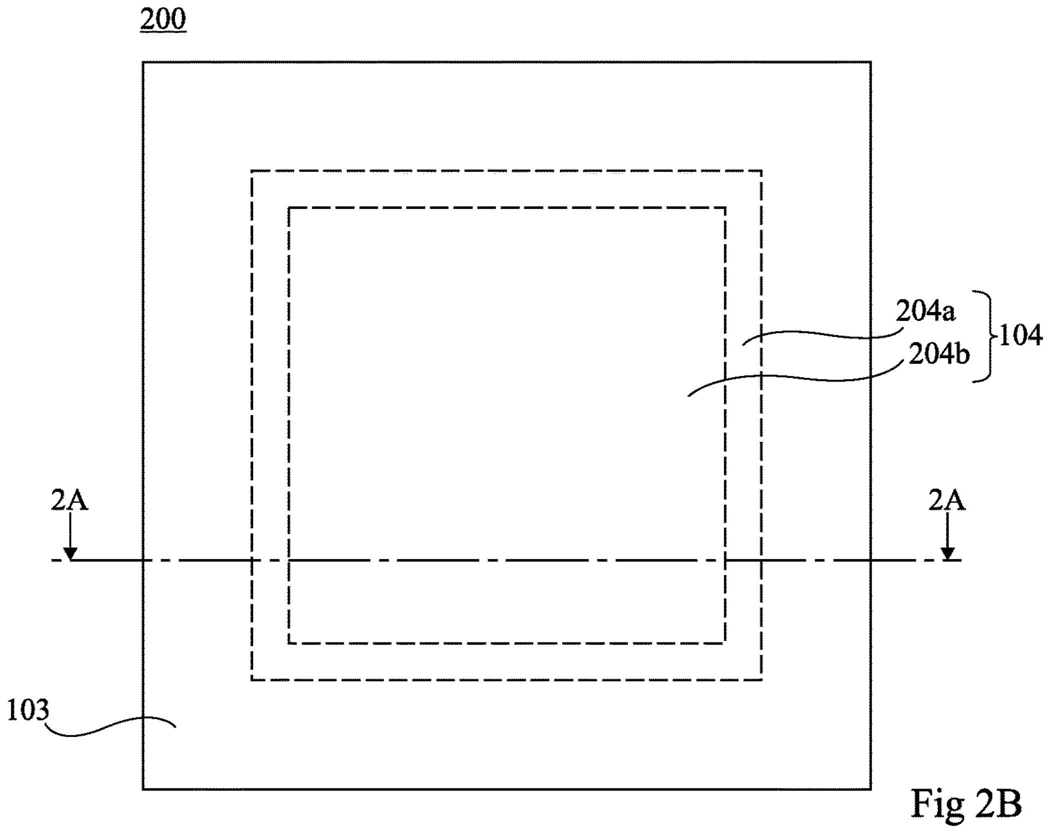

FIGS. 2A and 2B are respectively a cross-section view and a top view schematically showing an example of a CMUT transducer 200 according to an embodiment.

Transducer 200 has elements common with the transducer 100 of FIG. 1. The common elements will not be detailed again. In the rest of the description, only the differences with respect to transducer 100 will be highlighted.

Transducer 200 differs from the transducer 100 of FIG. 1 mainly in that, in transducer 200, the dielectric coating 104 arranged on the upper surface of substrate 101 at the bottom of cavity 105 is structured, that is, it does not extend with a uniform thickness all over the lower surface of cavity 105.

More particularly, in this example, coating 104 comprises a portion 204*a* having thickness t1, extending, in top view, opposite a peripheral portion of cavity 105, and a portion 204*b* having a thickness t2 greater than t1, extending, in top view, opposite a central portion of cavity 105. As an example, in top view, portion 204*a* has the shape of a ring in contact, by its outer edge, with the edge of cavity 105, for example, all along the periphery of cavity 105. Portion 204*b* for example has the shape of a solid plate extending opposite the entire remaining surface of cavity 105. As a non-limiting example, cavity 105 has, in top view, a rectangular shape, for example, a square shape, and the portion 204*a* of dielectric coating 104 has the shape of a rectangular ring of substantially uniform width in contact, by its outer edge, with the edge of cavity 105, all along the periphery of cavity 105. In the shown example, thickness t1 of dielectric coating 104 is substantially constant all along the peripheral portion 204*a* of coating 104, and thickness t2 of coating 104 is substantially constant all over the central portion 204*b* of coating 104.

Substrate 101 is preferably heavily doped, for example, with a doping level in the range from $10^{13}$ to $10^{18}$ atoms/$cm^3$. Layer 103 for example has a thickness in the range from 10 nm to 5 μm, for example in the order of 0.5 μm. The lateral dimensions of cavity 105 are for example in the range from 5 μm to 500 μm. The thickness t1 of dielectric coating 104 in its peripheral portion 204*a* is for example at least 10 nm smaller that the thickness t2 of coating 104 in its central portion 204*b*. As an example, the thickness t1 of dielectric coating 104 in its peripheral portion 204*a* is at least twice smaller than the thickness t2 of coating 104 in its central portion 204*b*. As an example, thickness t1 is in the range from 10 nm to 300 nm and thickness t2 is in the range from 100 nm to 500 nm. The thickness of semiconductor membrane 107 is for example in the range from 10 nm to 10 μm. Semiconductor membrane 107 may be doped or undoped. For example, semiconductor membrane 107 has a doping level lighter than that of substrate 101, for example, a doping level in the range from 0 to $10^{18}$ atoms/$cm^3$. Although this is not shown in FIGS. 2A and 2B, similarly to what has been described in the example of FIG. 1, a metal layer may be arranged on top of and in contact with the upper surface of membrane 107 to increase the electric conductivity of the upper electrode E2 of the transducer.

For more clarity, the upper electrode E2 of transducer 200 has not been shown in the top view of FIG. 2B.

In transducer 200, the distance between the upper surface of electrode E1 and the lower surface of electrode E2 opposite cavity 105 corresponds to the sum of the depth (vertical dimension in the orientation of FIG. 2A) of cavity 105 and of the thickness (vertical dimension in the orientation of FIG. 2A) of dielectric coating 104.

The dielectric permittivity of the insulating material forming coating 104 being greater than the permittivity of vacuum or of the air filling cavity 105, the structuring of dielectric coating 104 at the bottom of cavity 105 results, with respect to the transducer 100 of FIG. 1, in a relative decrease in the capacitance formed between the portions of electrodes E1 and E2 located opposite the peripheral portion 204*a* of coating 104, corresponding to a parasitic capacitance of the transducer, and/or in a relative increase in the capacitance formed between the portions of electrodes E1 and E2 located opposite the central portion 204*b* of coating 104, corresponding to the active capacitance of the transducer.

This results in an increase in the ratio of the active capacitance to the parasitic capacitance of the transducer, and thus in an increase in the sensitivity of the transducer with respect to the structure of FIG. 1.

It should be noted that in the example of FIGS. 2A and 2B, dielectric coating 104 only has two thickness levels t1 and t2. As a variation, a number of thickness levels greater than 2 may be provided, the thickness of dielectric coating 104 being then decreased gradually or in stepped fashion as the distance to the central portion of cavity 105 increases.

Figure 3:
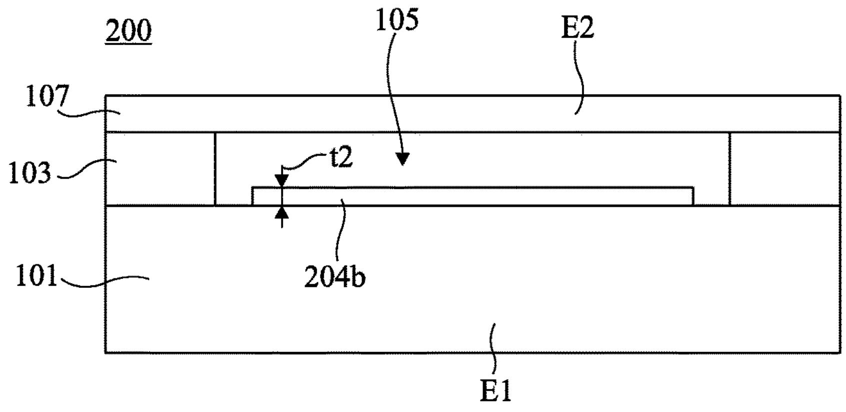
FIG. 3 is a cross-section view schematically showing another embodiment of a CMUT transducer.

FIG. 3 is a cross-section view schematically showing an alternative embodiment of the transducer 200 described in relation with FIGS. 2A and 2B.

The variant of FIG. 3 differs from the example of FIGS. 2A and 2B in that, in this variant, the peripheral portion 204*a* of dielectric coating 104 is totally removed, that is, its thickness t1 is zero. In other words, in this variant, the upper surface of substrate 101 is directly exposed at the bottom of a peripheral portion of cavity 105. This enables to still further decrease the parasitic capacitance formed between the portions of electrodes E1 and E2 opposite the peripheral portion of cavity 105 opposite the active capacitance formed between the portions of electrodes E1 and E2 as compared to the central portion of cavity 105.

The variant of FIG. 3 further enables to overcome another limitation of the structure of FIG. 1, that is, a lifetime limitation linked to phenomena of injection of parasitic electric charges into dielectric coating 104 at the bottom of cavity 105.

After a period of use of the transducer of FIG. 1, it can be observed that electric charges are trapped in dielectric coating 104 at the bottom of cavity 105. Such charges may induce a modification of the bias voltages required to drive the transducer. Under certain conditions, the charges may result in causing a breakdown of dielectric layer 104 at the bottom of cavity 105.

A first cause of injection of parasitic charges into the dielectric coating 104 of the transducer of FIG. 1 is that, in the collapsed position of membrane 107, a strong electric field is generated in the portion of dielectric coating 104 in contact with membrane 107 at the bottom of cavity 105. This may cause a transfer of electric charges from membrane 107 or from substrate 101 to dielectric coating 104.

Such a first cause of charge injection is also present in the transducer 200 of FIG. 3.

A second cause of injection of parasitic charges into the dielectric coating 104 of the transducer of FIG. 1 is linked to the fact that electrodes E1 and E2 are directly in contact respectively with the upper surface and with the lower surface of the dielectric walls supporting semiconductor membrane 107, formed by the portions of dielectric layer 103 laterally surrounding cavity 105. As a result, parasitic electric charges are injected into dielectric layer 103 at the periphery of cavity 105. Such parasitic charges normally have no incidence upon the operation of the transducer. However, in practice, it can be observed that over time, part of these charges migrates by diffusion into dielectric coating 104 at the bottom of cavity 105. This causes a decrease in the transducer lifetime, and this, even if it is ascertained never to place membrane 107 in collapsed position.

Such a second cause of charge injection is suppressed in the structure of FIG. 3, due to the physical discontinuity between the peripheral dielectric walls of support of membrane 107 and dielectric coating 104. This enables to increase the transducer lifetime as compared with the structure of FIG. 1.

It should be noted that the variant of FIG. 3 and the variant of FIGS. 2A and 2B may be combined. Thus, an interruption of dielectric coating 104 may be provided in the vicinity of the edge of cavity 105, as described in relation with FIG. 3, followed by a gradual or stepped increase of the thickness of dielectric coating 104 as the distance to the cavity edge increases, as described in relation with FIGS. 2A and 2B.

Figure 4A:
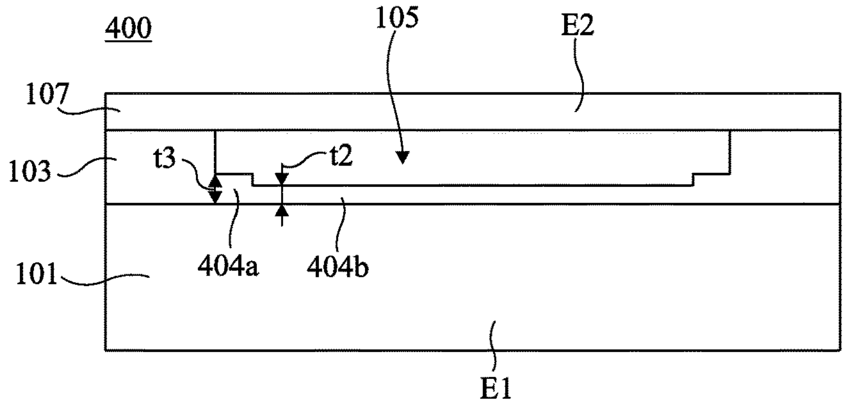
FIGS. 4A and 4B respectively are a cross-section view and a top view schematically showing another embodiment of a CMUT transducer.
Figure 4B:
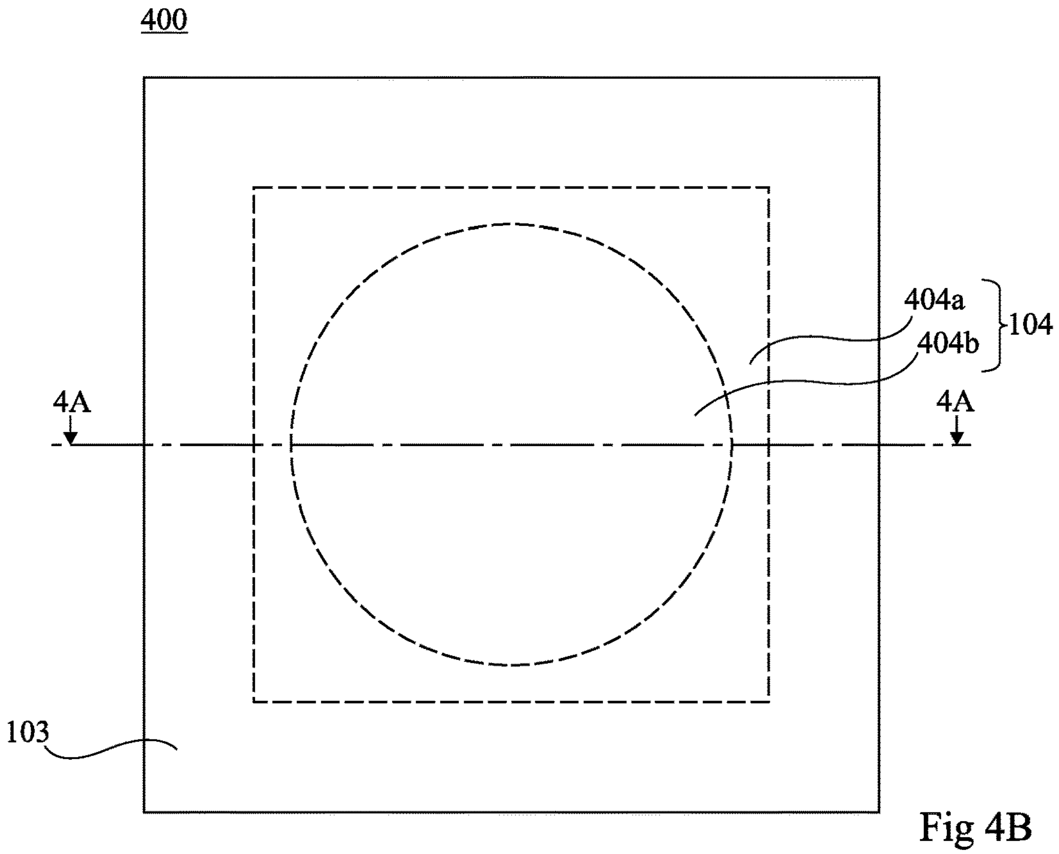

FIGS. 4A and 4B respectively are a cross-section view and a top view schematically showing another example of a CMUT transducer 400 according to an embodiment.

Transducer 400 has elements common with the transducer 100 of FIG. 1 and with the transducer 200 of FIGS. 2A and 2B. Such common elements will not be detailed again. In the rest of the description, only the differences with respect to transducers 100 and 200 will be highlighted.

The transducer 400 of FIGS. 4A and 4B differs from the transducer 100 of FIG. 1 mainly in that, in transducer 400, the dielectric coating 104 arranged on the upper surface of substrate 101 at the bottom of cavity 105 is structured, that is, it does not extend with a uniform thickness over the entire lower surface of cavity 105.

Unlike the transducer 200 of FIGS. 2A and 2B, in transducer 400, coating 104 comprises a portion 404*a* having a thickness t3, extending, in top view, opposite a peripheral portion of cavity 105, and a portion 404*b* having a thickness t2 smaller than t3 extending, in top view, opposite a central portion of cavity 105. As an example, in top view, portion 404*a* has the shape of a ring in contact, by its outer edge, with the edge of cavity 105, for example, all along the periphery of cavity 105. Portion 404*b* for example has the shape of a full plate extending opposite the entire remaining surface of cavity 105. As a non-limiting example, cavity 105 has, in top view, a rectangular shape, for example, a square shape, and the central portion 404*b* of dielectric coating 104 has the shape of a disk centered on the center of cavity 105.

The thickness t3 of dielectric coating 104 in its peripheral portion 404*a* is for example at least 10 nm greater that the thickness t2 of coating 104 in its central portion 404*b*. As an example, the thickness t1 of dielectric coating 104 in its peripheral portion 404*a* is at least twice greater than the thickness t2 of coating 104 in its central portion 404*b*. As an example, thickness t3 is in the range from 200 nm to 5 μm, for example in the range from 200 to 3000 nm, and thickness t2 is in the range from 100 to 500 nm.

In transducer 400, for a given bias voltage, due to the greater thickness of the peripheral portion 404*a* of dielectric coating 104, the electrostatic force exerted on the peripheral portion of membrane 107 is greater than the electrostatic force that would be exerted on this same peripheral portion in a transducer of the type described in relation with FIG. 1 (considering a dielectric layer 104 having a uniform thickness t2) This here again results from fact that the dielectric permittivity of the material forming coating 104 is greater than the dielectric permittivity of vacuum or of the air filling cavity 105. Thus, for a given distance between electrodes E1 and E2 and for a given voltage applied between electrodes E1 and E2, the electrostatic force exerted by electrode E1 on electrode E2 is all the greater as the thickness of dielectric coating 104 is large. This enables to increase the amplitude of the vertical motions of the membrane opposite the peripheral portion of the membrane, where displacements are mechanically limited due to the proximity of the peripheral area of attachment of the membrane to the upper surface of dielectric layer 103, without increasing the amplitude of the displacements in the central portion of the membrane, which would risk causing the collapsing of the membrane. Thus, the structuring of dielectric layer 104 enables to adjust the surface distribution of the electrostatic force to maximize the average amplitude of the displacements of the membrane, before the collapsing of the membrane. Further, the structuring of dielectric layer 104 enables to decrease the voltage necessary to place the membrane in collapsed position. This here again enables to increase the sensitivity with respect to the transducer of FIG. 1.

It should be noted that in the example of FIGS. 4A and 4B, dielectric coating 104 only has two thickness levels t3 and t2. As a variation, a number of levels greater than 2 may be provided, the thickness of dielectric coating 104 then being decreased gradually or in stepped fashion as the distance to the central portion of cavity 105 decreases.

The embodiment of FIGS. 2A, 2B, and 3 on the one hand (relative decrease of the thickness of dielectric coating 104 in the vicinity of the edges of cavity 105), and the embodiment of FIGS. 4A and 4B on the other hand (relative increase of the thickness of dielectric coating 104 in the vicinity of the edges of cavity 105) form alternative solutions to improve the sensitivity of a CMUT transducer. It will be within the abilities of those skilled in the art to select the solution best adapted according to the general configuration of the transducer and/or by routine tests or simulations.

Figure 5:
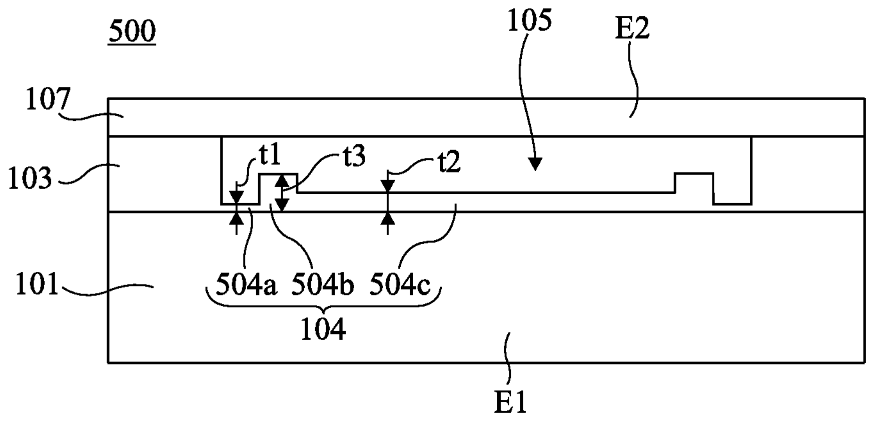
FIG. 5 is a cross-section view schematically showing another embodiment of a CMUT transducer.

As a variation, the two solutions may be combined to further increase the sensitivity of the transducer, as described in further detail hereafter in relation with FIG. 5.

FIG. 5 is a cross-section view schematically showing an example of a CMUT transducer 500 according to an embodiment.

Transducer 500 has elements common with the transducer 100 of FIG. 1, with the transducer 200 of FIGS. 2A and 2B, and with the transducer 400 of FIGS. 4A and 4B. Such common elements will not be detailed again. In the rest of the description, only the differences with respect to transducers 100, 200, and 400 will be highlighted.

Here again, the transducer 500 of FIG. 5 differs from the transducer 100 of FIG. 1 mainly in that, in transducer 500, the dielectric coating 104 arranged on the upper surface of substrate 101 at the bottom of cavity 105 is structured, that is, it does not extend across a uniform thickness all over the lower surface of cavity 105.

In transducer 500, coating 104 comprises a portion 504*a* having a thickness t1 extending, in top view, opposite a peripheral portion of cavity 105, a portion 504*c* having a thickness t2 greater than t1 extending, in top view, opposite a central portion of cavity 105, and a portion 504*b* having a thickness t3 greater than t2 extending, in top view, between peripheral portion 504*a* and central portion 504*c*.

As an example, in top view, portion 504*a* has the shape of a ring in contact, by its outer edge, with the edge of cavity 105, for example, all along the periphery of cavity 105. Intermediate portion 504*b* for example has, in top view, the shape of a ring in contact, by its outer edge, with the inner edge of ring 504*a*, for example all along the length of the inner edge of ring 504*a*. Portion 504*c* for example has the shape of a solid plate extending opposite the entire remaining surface of cavity 105.

The structure of FIG. 5 enables to combine the above-mentioned advantages of decrease of the parasitic capacitance formed between electrodes E1 and E2 in the vicinity of the edges of cavity 105, and of increase of the electrostatic force applied between electrodes E1 and E2 opposite a peripheral portion of cavity 105.

Similarly to what has been described hereabove for transducer 200, the peripheral portion 504*a* of dielectric coating 104 may comprise a plurality of levels of different thicknesses, smaller than thickness t2 of central portion 504*c*. The thickness of portion 504*a* then increases gradually or in stepped fashion as the distance to intermediate portion 504*b* decreases. Similarly, in the same way as described hereabove for transducer 400, the intermediate portion 504*b* of dielectric coating 104 may comprise a plurality of levels of different thicknesses, greater than thickness t2 of central portion 504*c*. The thickness of portion 504*b* then decreases gradually or in stepped fashion as the distance to central portion 504*c* decreases.

Further, the embodiment of FIG. 5 may be combined with the variant of FIG. 3. In other words, an interruption of dielectric coating 104 in the immediate vicinity of the edge of cavity 105, as described in relation with FIG. 3, may be provided.

The manufacturing of a CMUT transducer of the type described hereabove in relation with FIGS. 2A, 2B, 3, 4A, 4B, and 5 may for example comprise the successive steps of:

a) forming dielectric layer 103 on the upper surface of substrate 101;

b) forming cavity 105 on the upper surface side of dielectric layer 103; and c) transferring membrane 107 onto the upper surface of dielectric layer 103 and above cavity 105.

At step a), dielectric layer 103 may be formed by oxidation of an upper portion of substrate 101, for example, according to a dry thermal oxidation method, or by deposition of a dielectric material on the upper surface of substrate 101.

At step b), cavity 105 may be formed by local etching from the upper surface of dielectric layer 103. To obtain the different thickness levels of dielectric coating 104 at the bottom of cavity 105, cavity 105 may be formed in a plurality of successive steps of etching at different depths, by using a plurality of different etch masks. As an example, the number of successive etch steps and the number of different masks used corresponds to the desired number of different thickness levels of dielectric coating 104 at the bottom of cavity 105.

At step c), semiconductor membrane 107 may be attached by direct bonding or molecular bonding of its lower surface to the upper surface of dielectric layer 103. As an example, membrane 107 may correspond to the upper semiconductor layer of a stack of Sal (semiconductor on insulator) type.

Various embodiments and variants have been described. Those skilled in the art will understand that certain features of these various embodiments and variants may be combined, and other variants will occur to those skilled in the art. In particular, the described embodiments are not limited to the examples of dimensions and of materials mentioned in the present disclosure.

Further, although a single CMUT transducer is shown in the drawings, in practice, a plurality of identical or similar transducers may be simultaneously monolithically formed on a same substrate.

Further, in the shown examples, each transducer comprises a single cavity 105 between its lower and upper electrodes E1 and E2. As a variation, in each transducer 101, cavity 105 may be divided into a plurality of elementary cavities, for example arranged, in top view, in an array of rows and columns, laterally separated from one another by lateral walls formed by non-etched portions of dielectric layer 103.

Furthermore, in the above described embodiments, as a variation, instead of being arranged on the upper surface of the substrate at the bottom of the cavity, the structured dielectric coating 104 may be arranged on a lower surface of the membrane 107 at the top of the cavity.

Furthermore, instead of being formed by the substrate 101 itself, the bottom electrode E1 may be formed by a conductive layer (not shown) located on the upper surface of the substrate 101, at the bottom side of the cavity.

What is claimed is:

1. A CMUT transducer comprising:

a substrate coated with a dielectric layer;

a cavity formed in the dielectric layer;

a membrane suspended above the cavity, the membrane being a conductor or a semiconductor; and a dielectric coating arranged on an upper surface of the substrate at the bottom of the cavity or on a lower surface of the membrane at the top of the cavity and extending, in top view, on a majority of the respective upper surface of the substrate or lower surface of the membrane, wherein the dielectric coating comprises a first portion having a first thickness opposite a peripheral portion of the cavity, a second portion having a second thickness greater than the first thickness opposite a central portion of the cavity, and, between the first and second portions, at least one third portion having an intermediate thickness between the first and second thicknesses.

2. The CMUT transducer according to claim 1, wherein the dielectric coating is interrupted opposite a peripheral region of the cavity.

3. The CMUT transducer according to claim 1, wherein the substrate is made of silicon.

4. The CMUT transducer according to claim 1, wherein the dielectric layer is made of silicon oxide.

5. The CMUT transducer according to claim 1, wherein the membrane is made of silicon.

6. The CMUT transducer according to claim 1, wherein the dielectric coating is made of silicon oxide.

7. A method of manufacturing the CMUT transducer according to claim 1, comprising the successive steps of:

a) forming the dielectric layer on the upper surface of the substrate;

b) forming the cavity on the upper surface side of the dielectric layer; and c) transferring the membrane onto the upper surface of the dielectric layer, above the cavity.

8. The method according to claim 7, wherein step b) comprises a plurality of successive steps of etching at different depths and with different etch masks, to form the different thickness levels of the dielectric coating.

9. A CMUT transducer comprising:

a substrate coated with a dielectric layer;

a cavity formed in the dielectric layer;

a membrane suspended above the cavity, the membrane being a conductor or a semiconductor; and a dielectric coating arranged on an upper surface of the substrate at the bottom of the cavity or on a lower surface of the membrane at the top of the cavity and extending, in top view, on a majority of the respective upper surface of the substrate or lower surface of the membrane, wherein the dielectric coating comprises a first portion having a first thickness opposite a peripheral portion of the cavity, a second portion having a second thickness greater than the first thickness opposite a central portion of the cavity, and a third portion having a third thickness greater than the second thickness between the first and second portions.

* * * * *